Aug. 14, 1956     V. A. BOUFFORT     2,758,660
ENDLESS TRACK VEHICLE AND CONTROLS THEREFOR
OPERABLE FROM PRONE POSITION
Filed Jan. 26, 1955

INVENTOR

VICTOR ALBERT BOUFFORT

BY *Young, Emery & Thompson*

ATTYS.

2,758,660

ENDLESS TRACK VEHICLE AND CONTROLS THEREFOR OPERABLE FROM PRONE POSITION

Victor Albert Bouffort, Paris, France, assignor to Mecatec S. A., Tangiers, a limited liability stock company of Tangiers Application January 26, 1955, Serial No. 484,249

Claims priority, application Tangier February 3, 1954

1 Claim. (Cl. 180—6.7)

The present invention has for its object a light vehicle or tractor with endless tracks including a cockpit provided with the control means required for the steering and progression of the vehicle over ground.

This type of vehicle is generally provided with an internal combustion engine actuating the driving wheels by means of a clutch, a change speed gear and a differential actuating two driving stub-shafts carrying the driving wheels. The steering of vehicles equipped with endless tracks is generally performed by a braking of one or the other of said endless tracks.

These vehicles with endless tracks are much in use since a number of years, but their design no longer satisfies completely the more recent requirements and necessities of practice.

As a matter of fact, before it was desired to produce vehicles having a thick and consequently heavy armouring while being capable of being used as a sort of movable fortress, whereas on the contrary it is not desirable to realize a light and very low vehicle provided with endless tracks so that it may be easily concealed on grass-grown ground or behind bushes or small undulations of the ground.

The present invention has for an object a light vehicle having endless tracks of the type referred to, and which tends to satisfy these requirements, by the fact that the different control members are arranged approximately in a common horizontal plane and are located at either end of the cockpit at a distance equal substantially to man's height, the whole arrangement being designed in a manner such that a driver when recumbent may actuate said vehicle control members.

Accompanying drawing illustrates by way of example and in a diagrammatic manner a vehicle provided with endless tracks according to the invention.

Figure 1:
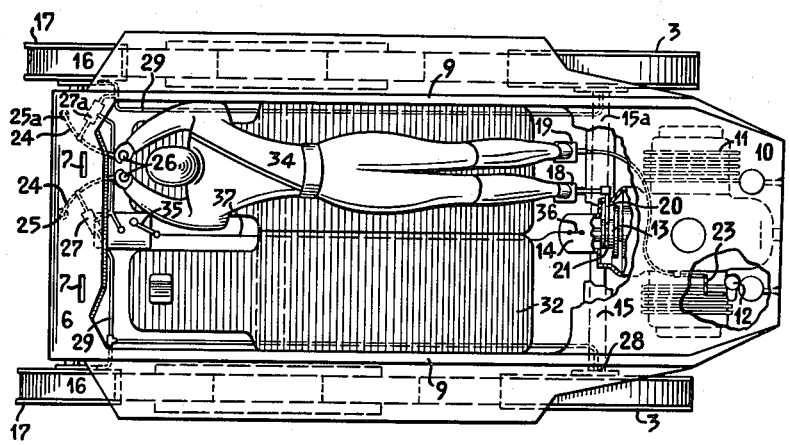
Fig. 1 is a view from above, the driver being shown in the driving position.
Figure 2:
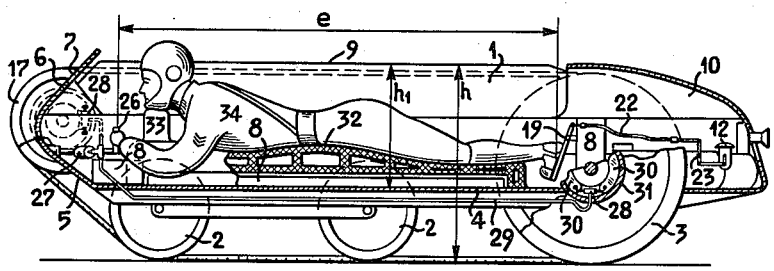
Fig. 2 is a sectional elevational view of the vehicle of Fig. 1.

According to the accompanying drawing, the vehicle includes a cockpit 1 carried by carrying wheels 2 and by driving wheels 3. Said cockpit comprises a floor 4 provided at its front end with an inclined dashboard 5 extending into a protecting section 6 provided with ports 7. The floor 4 is reinforced by transverse box-shaped girders 8 rigidly secured to two sidewalls 9. At the rear of the cockpit 1, the vehicle includes a compartment 10 enclosing an internal combustion engine 11 provided with a carburettor 12. Said engine is connected with the driving wheels by means of a clutch 13, a change speed gear and a differential, all enclosed inside a casing 14. Said differential actuates two driving shafts 15 and 15a carrying the driving wheels 3.

The endless tracks 16 are constituted each by an endless strip of reinforced rubber. The endless tracks guided by the carrying wheels and by the driving wheels are held tight by guiding and tightening members 17.

These different parts and propelling means being of a conventional type will not be described further here.

On the rear transverse girder 8 which separates the cockpit 1 from the compartment 10, are hinged two pedals 18 and 19. The pedal 18 is mechanically connected with a fork 20 engaging a groove 21 made in the axially movable part of the clutch 13. On the other hand, the pedal 19 is connected by the intermediary of a Bowden cable 22, or like mechanical connecting means, with a control lever 23 of the throttle valve of the carburettor 12.

The front part of the cockpit 1 is provided with two arms 24 hinged at 25 and 25a and provided each with a handle 26. These pivoting arms 24 are connected each with the piston of a pump 27 and 27a, said pumps being connected through pipes 29 with hydraulic servomotors 28. These servomotors act on the brake segments 30 so as to urge the latter against the drums 31 rigidly fastened to the driving wheels 3 and to the guiding and tightening members 17. Lastly, the cockpit 1 is further provided with a body-rest 32 and with a head-rest 33.

The driver 34, lying recumbent on the body-rest as illustrated on the drawing, lays his feet on the pedals 18 and 19 and takes hold of the two handles 26. By actuating the pedal 18 with his left foot, he produces the disengagement of the two parts of the clutch 13 and consequently a breaking off of the mechanical connection connecting the engine 11 with the change speed gear. By actuating then a lever 35 connected mechanically, for instance by means of a Bowden cable 37 or the like mechanical means, with a lever 36 controlling the sliding gear (not illustrated) of the change speed gear, he puts the desired speed in gear.

By acting with his right foot on the pedal 19, the driver controls the admission of fuel into the engine 11 by a modification of the opening of the throttle valve of the carburettor 12.

To steer towards the left or towards the right, it is sufficient to act on the corresponding lever 24 so as to produce, by the intermediary of the pump 27 or 27a, a delivery of oil into the servomotor 28 of the left hand or right hand brakes. The arrangement of the hydraulic brakes referred to is wholly similar to the arrangement of hydraulic brakes provided for instance on automobiles. The driver, when acting simultaneously on both arms 24, produces a braking of the vehicle.

By reason of the recumbent position assumed by the driver, it is possible to reduce the height $h_1$ of the cockpit to a minimum value which is smaller than the height of a man when seated, for instance a height less than 0.60 m. It is consequently possible to design an extremely low vehicle, the height $h$ of which is for instance less than 0.80 m., which constitute a target very difficult to hit and which is concealed from the view of an observer by each unevenness of the ground.

As illustrated on the drawing, the control members required for the steering of the vehicle and those required for controlling its movements, are located approximately in a common horizontal plane. The control members for the steering are located at the front of the cockpit, while the control members of the acceleration and of the operation of the clutch are located in the rear part of said cockpit. The distance $e$ separating the two groups of control members is approximately equal to man's height. Obviously these control members may be modified so as to satisfy the different requirements which may appear in each case.

I claim:

In a light motor vehicle, comprising endless tracks, an elongated cockpit substantially corresponding in length to the average of a human occupant in prone position, a compartment located at the rear end of said vehicle, an internal combustion engine located in said compartment, driving wheels driving said tracks and driven by said engine by means of two driving shafts, a change speed gear, a differential and a two-part clutch, steering and control members located at both ends of said cockpit, in which said control members are constituted by two foot pedals hinged at the rear end of said cockpit, whereby the right foot pedal controls the fuel feeding to said engine and the left foot pedal controls the engagement and disengagement of the two parts of said clutch, and in which said steering members are constituted by two handles hinged at the front end of said cockpit, two hydraulic pumps actuated by said handles, conduits connected to said pumps, servo-motors connected to said conduits, brakes actuated by each of said servo-motors whereby the left hand handle controls the left hand brakes and the right hand handle the right brakes, a body rest rigidly fastened to the bottom of said cockpit between said steering and said control members, a head rest fastened to the bottom of said cockpit in front of said body rest and further a control member located in the front part of said cockpit, and mechanically connected to sliding gears of said change speed gear.

References Cited in the file of this patent

UNITED STATES PATENTS

| | | |
|---|---|---|
| 2,226,027 | Stoner | Dec. 24, 1940 |
| 2,254,890 | Gardiner | Sept. 2, 1941 |
| 2,349,535 | Baldine | May 23, 1944 |
| 2,377,838 | Collings | June 5, 1945 |
| 2,457,400 | Roos | Dec. 28, 1948 |

FOREIGN PATENTS

| | | |
|---|---|---|
| 665,817 | Germany | Oct. 4, 1938 |
| 429,852 | Great Britain | June 7, 1936 |